C. F. WINSOR.
Feathering Paddle-Wheel.

No. 215,703.                   Patented May 20, 1879.

WITNESSES
Robert Everett
H. Clay Smith

INVENTOR,
Charles F. Winsor
By Gilmore, Smith & Co,
ATTORNEYS.

UNITED STATES PATENT OFFICE.

CHARLES F. WINSOR, OF SEATTLE, WASHINGTON TERRITORY.

IMPROVEMENT IN FEATHERING PADDLE-WHEELS.

Specification forming part of Letters Patent No. 215,703, dated May 20, 1879; application filed March 1, 1879.

*To all whom it may concern:*

Be it known that I, CHARLES F. WINSOR, of Seattle, in the county of King and Territory of Washington, have invented a new and valuable Improvement in Feathering Paddle-Wheels; and I do hereby declare that the following is a full, clear, and exact description of the construction and operation of the same, reference being had to the annexed drawings, making a part of this specification, and to the letters and figures of reference marked thereon.

Figure 1:
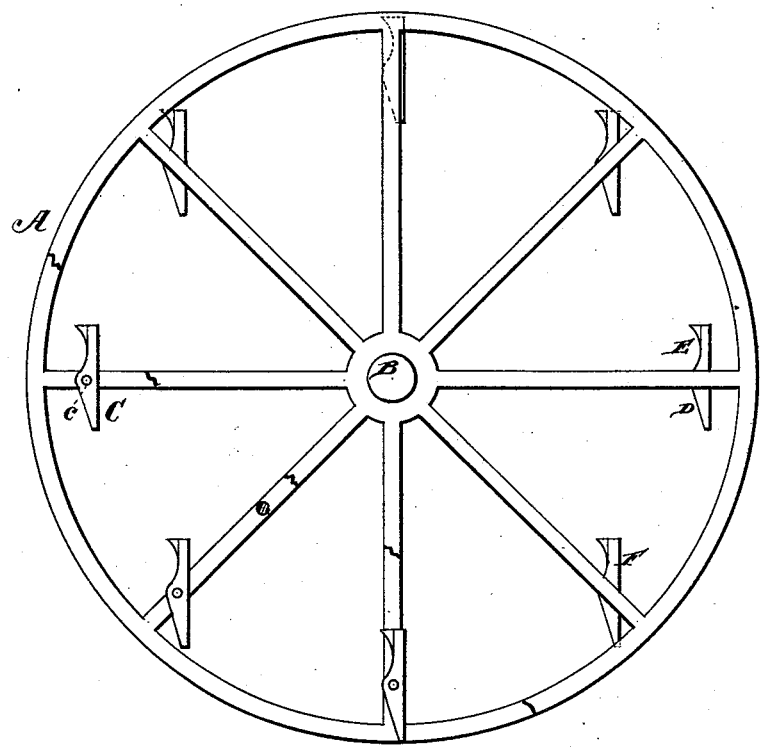
Figure 2:
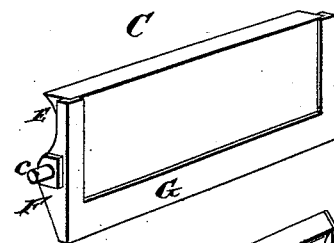
Figure 3:
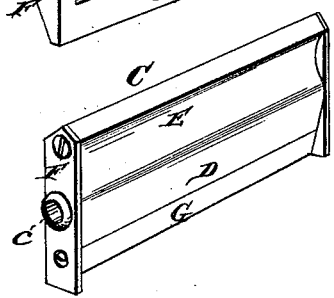
Figure 4:
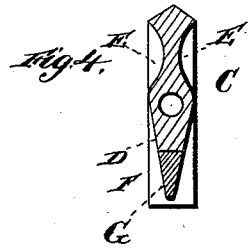

Figure 1 of the drawings is a representation of a side elevation of my paddle-wheel, and Figs. 2 and 3 are perspective views of the paddles. Fig. 4 is a sectional detail view of the same.

This invention relates to certain improvements in that class of paddle-wheels in which a series of loosely-pivoted buckets, weighted at their lower edges, so that they will enter and leave the water in a vertical position, are employed.

The object of the invention is to so construct the buckets that they will take better hold upon the water, and decrease the slip of the wheel, as more fully hereinafter specified.

To this end my invention consists in constructing the buckets or paddles with their lower portions beveled, and their upper portions dished or concave on one or both sides, and inclosing the ends of said paddles or buckets by means of suitable frames or side pieces, so as to form cups, which will take hold of the water and prevent slipping, the lower edges of the buckets being weighted, so that they will be vertical when in a normal position, but will turn aside when they encounter any unusual obstruction in the water.

The letter A represents a paddle-wheel of any suitable description, mounted upon a journal or shaft, B, in the ordinary manner.

C represents the paddles or buckets, pivoted within the wheel upon bearings c, or in any other suitable manner. Said paddles are beveled from the axis upon which they turn to their lower edges, upon one or both sides, as shown at D, and are dished on one or both sides above said axis, as shown at E.

The ends of said buckets are inclosed by a frame or side pieces, F, which form cups or recesses on both sides of said buckets or paddles, to take hold of the water and prevent slipping.

The lower edges of the buckets are weighted, as shown at G, either by means of a heavy metallic cross-piece secured between the side pieces, and forming a continuation of the lower beveled edge of the buckets or paddles, as shown in Figs. 3 and 4 of the drawings, or by giving the lower edge of the inclosing-frame sufficient weight of metal, as shown in Fig. 2 of the drawings.

It is evident that the weighted lower edges of the paddles or buckets will hold the same vertically in a normal position, so that they will enter and leave the water in a vertical position, thus feathering said buckets or paddles as they enter the water, and preventing any lifting of the water as they emerge from the same.

The dished upper side or sides of the paddle assist in taking hold of the water and in keeping the buckets or paddles in a vertical position as they emerge, while the cups or recesses formed by inclosing the ends of the paddles or buckets prevent any slipping as they are passing through the water.

As the buckets are free to turn when any undue pressure is brought to bear against the upper or lower edge, as in case of an unusual obstruction in the water, they will yield and pass over such obstruction without damaging the wheel or driving machinery of the same; and as they are kept in normal position simply by the weight at their lower edges, all gearing for the purpose is obviated, and a much lighter and more inexpensive wheel is produced.

I claim—

A bucket or paddle for a paddle-wheel having its lower edge weighted and beveled on one side and its upper portion carved inwardly, to form a hollow or scoop to hold the water while immersed therein, the ends of said bucket or paddle being inclosed, as described, and the bucket or paddle pivoted in the wheel, substantially as and for the purposes set forth.

In testimony that I claim the above I have hereunto subscribed my name in the presence of two witnesses.

CHARLES F. WINSOR.

Witnesses:
ROSWELL SCOTT,
FRED. W. SPARLING.